(12) United States Patent
Ryu et al.

(10) Patent No.: US 7,855,835 B2
(45) Date of Patent: Dec. 21, 2010

(54) LIGHT DIFFUSIVE SHEET FOR BACKLIGHT UNIT AND PREPARATION THEREOF

(75) Inventors: Dae Gi Ryu, Yongin-si (KR); Jong Seul Lee, Suwon-si (KR); Ki Nam Byun, Suwon-si (KR); Yong Lae Yi, Anyang-si (KR); Eung Jae Oh, Bucheon-si (KR)

(73) Assignee: SKC Haas Display Films LLC., Chungcheongnam-do (KR)

( * ) Notice: Subject to any disclaimer, the term of this patent is extended or adjusted under 35 U.S.C. 154(b) by 357 days.

(21) Appl. No.: 11/992,541

(22) PCT Filed: Sep. 29, 2006

(86) PCT No.: PCT/KR2006/003920

§ 371 (c)(1),
(2), (4) Date: Mar. 25, 2008

(87) PCT Pub. No.: WO2007/037649

PCT Pub. Date: Apr. 5, 2007

(65) Prior Publication Data
US 2009/0135489 A1    May 28, 2009

(30) Foreign Application Priority Data

| | | |
|---|---|---|
| Sep. 29, 2005 | (KR) | 10-2005-0091278 |
| Nov. 11, 2005 | (KR) | 10-2005-0108135 |
| Nov. 14, 2005 | (KR) | 10-2005-0108460 |
| Nov. 14, 2005 | (KR) | 10-2005-0108491 |
| Dec. 15, 2005 | (KR) | 10-2005-0124027 |
| Dec. 15, 2005 | (KR) | 10-2005-0124075 |
| Dec. 19, 2005 | (KR) | 10-2005-0125376 |
| Mar. 24, 2006 | (KR) | 10-2006-0026892 |
| Jun. 8, 2006 | (KR) | 10-2006-0051311 |

(51) Int. Cl.
*G02B 5/02* (2006.01)
(52) U.S. Cl. ..................... 359/599; 359/900
(58) Field of Classification Search ................... 349/64, 349/112, 137; 359/599, 601, 609, 613, 900
See application file for complete search history.

(56) References Cited

U.S. PATENT DOCUMENTS

| | | | |
|---|---|---|---|
| 5,706,134 A * | 1/1998 | Konno et al. ................. 359/599 |
| 6,076,933 A | 6/2000 | Diloreto et al. | |
| 6,256,146 B1 * | 7/2001 | Merrill et al. ................ 359/500 |
| 6,606,133 B1 | 8/2003 | Okabe | |
| 6,771,335 B2 * | 8/2004 | Kimura et al. ................ 349/112 |
| 6,913,365 B2 * | 7/2005 | Masaki et al. ................ 362/627 |
| 7,218,450 B2 * | 5/2007 | Ahn et al. ..................... 359/599 |
| 7,245,434 B2 * | 7/2007 | Nishida et al. ............... 359/599 |
| 7,271,862 B2 * | 9/2007 | Matsunaga et al. ............ 349/64 |
| 7,283,304 B2 * | 10/2007 | Murata et al. ................ 359/599 |
| 7,505,104 B2 * | 3/2009 | Watanabe et al. ............ 349/137 |
| 2005/0231807 A1 * | 10/2005 | Suga et al. ................... 359/601 |
| 2007/0139782 A1 * | 6/2007 | Ito et al. ...................... 359/599 |

* cited by examiner

*Primary Examiner*—Frank G Font
(74) *Attorney, Agent, or Firm*—Bacon & Thomas, PLLC (57) ABSTRACT

A light diffusive sheet for a backlight unit, comprising a transparent substrate-photocured resin layer laminate having a plurality of hemispherical-shaped protrusions of varying sizes, has excellent luminance, and a wide screen view angle.

21 Claims, 3 Drawing Sheets

LIGHT DIFFUSIVE SHEET FOR BACKLIGHT UNIT AND PREPARATION THEREOF

TECHNICAL FIELD

The present invention relates to a light diffusive sheet for a backlight unit of a liquid crystal display device, and a method for preparing same.

BACKGROUND ART

A liquid crystal display device (LCD), which is typically driven in a TN (twisted nematic), STN (super twisted nematic) or TFT (thin film transistor) mode, has been widely used in various electronic appliances including electronic watches, calculators, LCD TVs, and notebook computers, as well as in speed indication boards and movement systems of automobiles and airplanes. The LCDs are known to be advantageous in terms of a low electric power consumption, low driving voltage, light weight and thickness, while they are hampered by disadvantages such as narrow view angle, high operation temperature, and small display face size.

An LCD typically comprises a backlight unit, which functions as a light controlling apparatus for delivering light uniformly onto the entire face of LCD window. Accordingly, the backlight unit generally requires the emittance of a brighter light with minimized electric power consumption and a uniformity of brightness to the display window.

Figure 1:
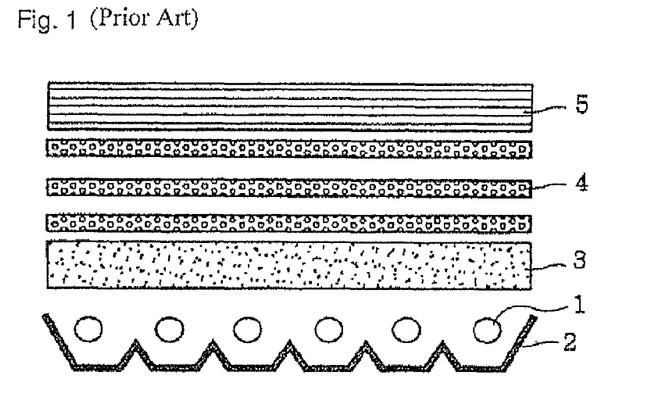
FIG. 1: a schematic view of a conventional backlight unit.

As shown in FIG. 1, a conventional backlight unit comprises lamp (1) for use as a light source, reflective plate (2) for reflecting light exited from the lamp, optical waveguide plate (3) for delivering light, a molded frame (not shown) for integrating the constitutional elements, light diffusive sheet (4) for enhancing the luminance and the view angle, and front panel (5).

The light diffusive sheet is typically prepared by coating a binder resin containing beads on the surface of a substrate to form a bead-containing light diffusive sheet, as disclosed, e.g., in Japanese Laid-open Patent Publication No. 1995-174902. In this method, the substrate is made of a polyester (e.g., polyethylene terephthalate), or poly-carbonate resin; the beads, an acrylic resin or glass; and, the binder resin, an acrylic or urethane-based resin. However, this method suffers from the disadvantage that the beads tend to drop out the sheet in the course of a sheet cutting process, which causes defects on the display screen comprising the sheet.

Further, there has been reported another method of preparing a light diffusive sheet, which involves forming a specified embossing on the surface of a substrate made of a thermoplastic resin. However, since this method requires the use of a roller mold having several tens micron sized embossing on the surface thereof, the production cost is high and it is difficult to fabricate an embossed mold which can attain the desired diffusion effect.

Further, Japanese Laid-open Patent Publication No. 2000-193805 discloses a process for preparing a light diffusive sheet comprising laminating a UV-curable resin film on the surface of a substrate using a mold having a surface with a plurality of parts each curved like a lens, pressing the resin on the surface of the mold to transcribe the lens pattern from the mold to the resin, curing the resin by UV irradiation, and releasing the mold from the resin. This method has the problems that bubbles may be incorporated in the resin layer upon laminating the UV-curable resin film, the patterns of the sheet obtained are easily damaged due to the use of UV curable resin in the form of a film, and the luminance may unsatisfactorily low because the light diffusive layer replicated from the mold has a reversed lens figure.

DISCLOSURE OF INVENTION

Technical Problem

Accordingly, it is an object of the present invention to provide a light diffusive sheet for a backlight unit, having excellent luminance, a large view angle of the screen, and good durability.

Technical Solution

In accordance with one aspect of the present invention, there is provided a light diffusive sheet for a backlight unit, comprising a transparent substrate and a photocured resin layer in the form of a plurality of protrusions formed on the surface of the substrate, the protrusions having hemispherical shapes of varying sizes.

In accordance with another aspect of the present invention, there is provided a process for preparing the light diffusive sheet, comprising the steps of:

(i) fabricating a patterned roller or belt equipped with a metal or polymer sheet having a plurality of hemispherical-shaped recessed portions of varying sizes on the surface thereof;

(ii) coating a photocurable resin composition on the surface of the recessed portions of the patterned roller or belt (A), or on one surface of a transparent substrate (B);

(iii) laminating the surface of (A) and (B) such that the photocurable resin coating is disposed therebetween;

(iv) pressurizing the resulting laminate while curing the photocurable resin composition; and (v) releasing a laminate of the transparent substrate and the photocured resin layer, the surface of the photocured resin layer having a plurality of protrusions formed in conformity with the recessed portions on the surface of the patterned roller or belt.

BRIEF DESCRIPTION OF THE DRAWINGS

The present invention will become apparent from the following description thereof, when taken in conjunction with the accompanying drawings which respectively show.

MODE FOR THE INVENTION

(A) Light Diffusive Sheet

A light diffusive sheet for a backlight unit, according to the present invention, is characterized in that a photocured resin layer is formed on one surface of a transparent substrate, the surface of the resin layer having a plurality of hemispherical-shaped protrusions of various sizes.

The inventive light diffusive sheet may further comprises a photocured resin layer whose surface has a plurality of hemispherical-shaped recessed portions, or a transparent resin layer containing beads, disposed on the surface opposite to the protrusion-formed face of the substrate.

In accordance with the present invention, there may be inserted a primer layer between the transparent substrate and the photocured resin layer, to improve the coating and adhesion characteristics.

The transparent substrate used in the inventive light diffusive sheet may be any material which transmits an energy wave such as ultraviolet/visible light and electron beam. Representative examples thereof include a polyester, polyacryl, polycarbonate, polyvinylchloride, polyvinylidene fluoride, polymethacrylamide resin, and a mixture thereof. In particular, it is preferred to use a polymethyl methacrylate resin, optionally mixed with a polyvinylidene fluoride, a polycarbonate, and a polyester such as polyethylene terephthalate (PET), which has a refractive index and surface reflection lower than those of the patterned wiring portion. The transparent substrate may have a thickness ranging from 50 to 200 µm.

In the present invention, a photocurable resin, which can be cured by irradiation with ultraviolet or electron beam, is used. Representative examples of the photocurable resin may be a polyester-, epoxy-, or (meth)acrylate-based resin (e.g., polyester (meth)acrylate, epoxy (meth)acrylate, urethane (meth)acrylate). The (meth)acrylate-based resin is particularly preferred owing to its optical characteristics. The photocurable resin preferably has a refractive index of 1.24 to 1.60.

A photocurable resin composition comprising a multifunctional (meth)acrylate (e.g., polyol poly(meth)acrylate, polyester poly(meth)acrylate, epoxy poly(meth)acrylate, urethane poly(meth)acrylate, and a combination thereof), a mono(meth)acrylate (e.g., monoalcohol mono(meth)acrylate, polyol mono(meth)acrylate, and a combination thereof), and a photo-initiator may be preferably used for forming the photocured resin layer of the inventive light diffusive sheet.

Figure 2:
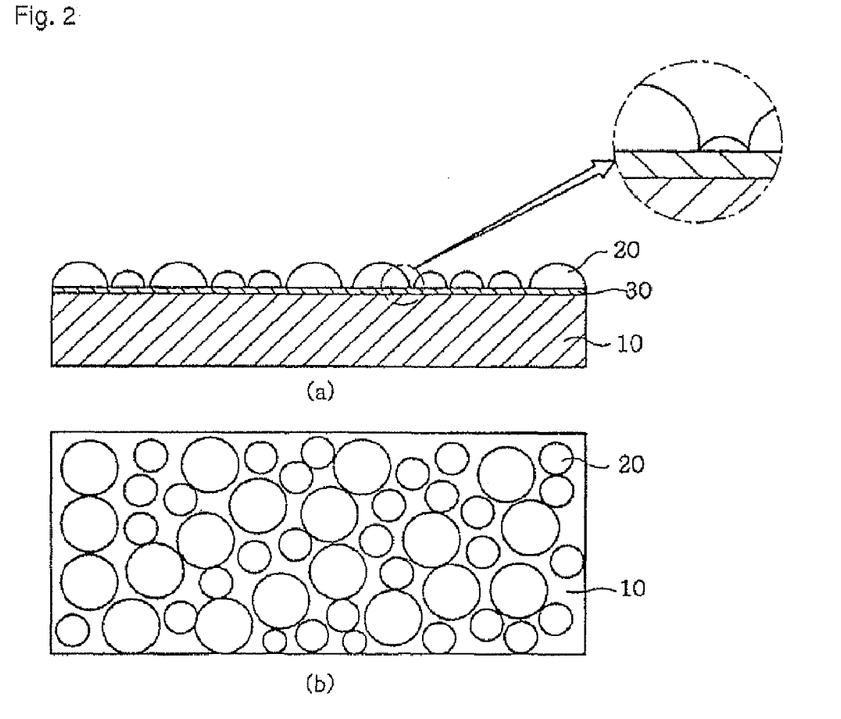
FIGS. 2 to 4: schematic cross-sectional views of various embodiments of the light diffusive sheets according to the present invention.
Figure 3:
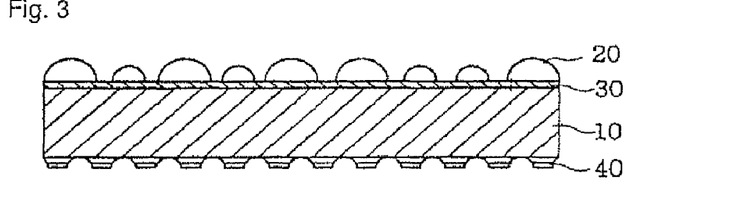
Figure 4:
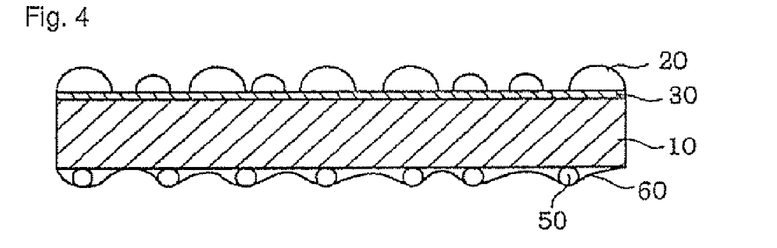

FIGS. 2 to 4 illustrate schematic cross-sectional views of various embodiments of the light diffusive sheets according to the present invention.

Referring to FIG. 2(a), photocured resin layer (20) is formed on one surface of transparent substrate (10), the surface of the resin layer having a plurality of hemispherical-shaped protrusions of varying sizes. The space between protrusions may form a convex arc, thus improving the luminance of the light diffusive sheet. Primer layer (30) may be formed on transparent substrate (10) before the formation of the photocured hemispherical protrusions. FIG. 2(b) represents a top view of the inventive light diffusive sheet showing the photocured protrusions having varying sizes are randomly distributed on the surface of the transparent substrate.

In the present invention, the protrusions formed on the substrate have varying diameters within the range of about 10 to 100 µm, thus enhancing the light diffusion effect and improving the luminance and haze characteristics. The area of the protrusions may constitute 50 to 90% of the entire surface area of the transparent substrate. When the area of the protrusions is less than 50%, the luminance of the sheet becomes low, while it is technically difficult to expand the area of the protrusions beyond 90%.

Referring to FIG. 3, there is provided photocured resin layer (40) in the form of a plurality of recessed portions having hemispherical shapes disposed on the surface opposite to the protrusion-formed face of transparent substrate, for the purpose of imparting scratch resistance to the light diffusive sheet. A primer layer (not shown) may be formed on the transparent substrate before the formation of the photocured recessed resin layer.

The recessed portions of the photocured resin may have varying diameters in the range of about 5 to 1,000 µm and a depth ranging from 1 to 500 µm. When the diameter is less than 5 µm, it is difficult to obtain the desired luminance, while when the diameter exceeds 1,000 µm, moire phenomena occurs.

The area of the recessed portions may constitute 5 to 50% of the entire surface area of the transparent substrate. When the area of the recessed portions is less than 5%, the scratch resistance is not sufficient, while when it exceeds 50%, the luminance becomes low.

In accordance with another aspect of the present invention, the light diffusive sheet may further comprises transparent resin layer (60) containing beads (50) on the surface opposite to the protrusion-formed surface of the substrate, as shown in FIG. 4, so as to improve the scratch resistance of the sheet.

The bead-containing transparent resin layer used as a scratch resistance imparting layer may be formed by coating a mixture of beads and a transparent binder resin on a transparent substrate, or on a primer coat layer formed on the transparent substrate, and drying the resulting coated layer.

The beads which may be used in the present invention are organic or inorganic beads or a mixture thereof. The organic beads may be made of an acrylic resin such as polymethyl methacrylate (PMMA), a silicone resin such as methyl silicone and poly-organosiloxane, a nylon resin, a melamine resin such as melamine formaldehyde, a styrenic resin such as polystyrene (PS) and methylstyrene, an acrylic-styrenic resin such as PMMA-PS, a vinylic resin such as divinylbenzene, and may be in the form of a soft microcapsule filled with a liquid organic material. The inorganic beads may be made of calcium carbonate or silica ($SiO_2$). An organic-inorganic hybride type such as silica-containing PMMA may also be used.

The beads may be used in an amount of 0.01 to 70 parts by weight, preferably 0.01 to 50 parts by weight, based on 100 parts by weight of the transparent resin used. If the amount is less than 0.01 part by weight, the scratch resistance becomes unsatisfactory, whereas if it exceeds 70 parts by weight, the optical properties deteriorate.

The beads preferably have an average particle size ranging from 0.1 to 50 µm. When the size is less than 0.1 µm, the elasticity of the beads is low, and when the size is greater than 50 µm, the optical properties becomes poor.

The transparent binder resin used together with the beads may comprise an acrylic or urethane resin.

In accordance with the present invention, as mentioned previously, a primer layer may be inserted between the transparent substrate and the photocured resin layer to improve the coating and adhesion characteristics.

The primer layer may comprise a thermocurable resin, and representative examples of the thermocurable resin may be a polyurethane resin prepared by reacting a polyester polyol, which is obtained by polycondensing a saturated or unsaturated di-carboxylic acid and a $C_{2-8}$ alkylene glycol, with a polyisocyanate to provide a precursor, and then reacting the precursor with a bisulfite of an alkali or alkaline earth metal. The saturated or unsaturated dicarboxylic acid may be succinic acid, adipic acid, sebacic acid, phthalic acid, maleic acid and a mixture thereof, and the $C_{2-8}$ alkylene glycol may be ethylene glycol, diethylene glycol, propylene glycol, butylene glycol, neopentyl glycol, hexylene glycol, and a mixture thereof. Further, representative examples of the polyisocyanate include 2,4- or 2,6-tolylene diisocyanate, xylene diisocyanate, 4,4-diphenylmethane diisocyanate, tetramethylene diisocyanate, hexamethylene diisocyanate, trimethyl hexamethylene diisocyanate, and aliphatic di-isocyanates.

The primer layer may have a thickness of 0.001 to 1 μm at a coating amount of 0.01 to 0.5 g/m². If the thickness is less than 0.001 μm, the coated layer is not uniform, and if the thickness is greater than 1 μm, the adhesion becomes poor.

(B) Preparation of Light Diffusive Sheet

Figure 5:
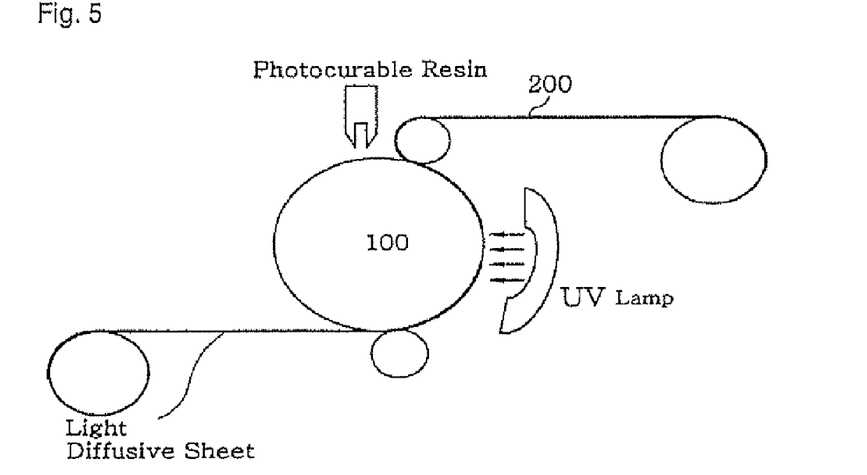
FIGS. 5 and 6: examples of some of the embodiments of apparatuses for preparing the light diffusive sheet in accordance with the present invention.
Figure 6:
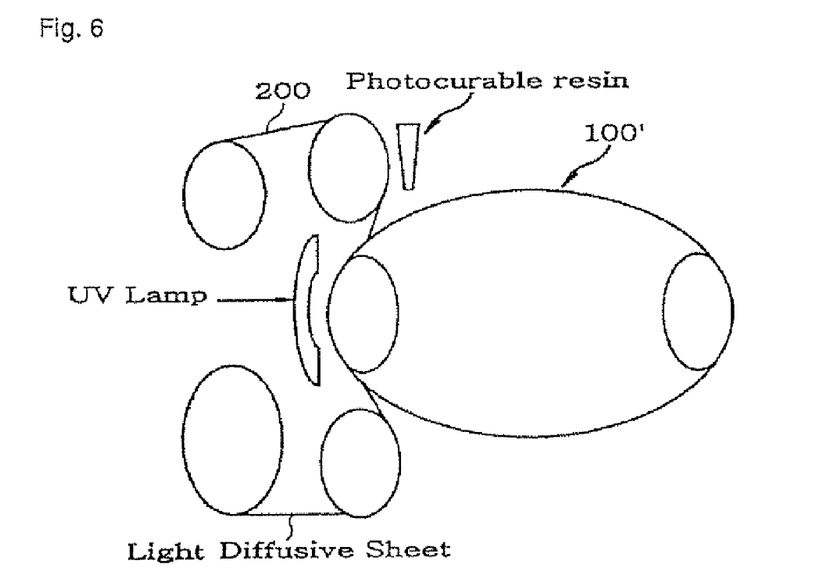

Referring to FIGS. 5 and 6, the inventive light diffusive sheet may be prepared using a roller (100) or belt (100') equipped with (or wound by) a metal or polymer sheet having a plurality of hemispherical-shaped recessed portions of varying sizes on the surface thereof (hereinafter, "patterned roller or belt").

Specifically, a photocurable resin composition is coated on the surface of the recessed portions of patterned roller or belt (100 or 100')(A), or one surface of transparent substrate (200) (B), and (A) and (B) are laminated such that the coating layer is disposed therebetween. The resulting laminate is pressurized while curing the photocurable resin composition, and then the transparent substrate-photocured resin layer laminate having a plurality of protrusions which were formed in conformity with the recessed portions is removed from the patterned roller or belt to obtain the inventive light diffusive sheet.

In the process of the present invention, the polymer sheet, which is used in the patterned roller or belt (100 or 100') and has a plurality of hemispherical-shaped recessed portions of varying sizes on the surface thereof, i.e., a patterned polymer sheet, may be fabricated by forming a layer of a thermoplastic resin such as a polyethylene resin on the surface of a transparent substrate such as a polyester film; introducing a plurality of spherical beads of varying sizes in the thermoplastic resin layer while melting the resin layer to form a bead-containing resin layer wherein the beads are partially imbedded in the thermoplastic resin layer; and obtaining a patterned polymer sheet by removing the beads from the bead-containing resin layer using a photo- or thermo-curable resin or an adhesive film.

The removal of beads using the photo- or thermo-curable resin layer may be carried out by coating a photo- or thermo-curable resin on the bead-containing resin layer, laminating a transparent film thereon, curing the resulting laminate, and separating the laminate of the transparent film and the photo- or thermo-curable resin layer to which the beads are attached, to obtain a patterned thermoplastic resin sheet. Further, the removal of beads using the adhesive film may be simply achieved out by laminating a film having an adhesive layer on the bead-containing resin layer.

The polymer sheet may have a thickness ranging from 0.05 to 2 mm.

Further, in the inventive process, the metal sheet to be mounted onto the roller or belt and having a plurality of hemispherical shaped recessed portions of varying sizes on the surface thereof, i.e., a patterned metal sheet, may be fabricated by plating or coating a bead-containing thermoplastic resin layer obtained by the same method as described in the fabrication of the patterned polymer sheet with a metal to form a metal layer, and releasing the resulting metal layer from the bead-containing thermoplastic resin layer.

Alternatively, in the above process, the metal-plating or coating may be conducted on the surface of a final light diffusive sheet fabricated by the process according to the present invention, instead of on the bead-containing thermoplastic resin layer, followed by releasing the resulting metal layer, to obtain the desired metal sheet.

Figure 7:
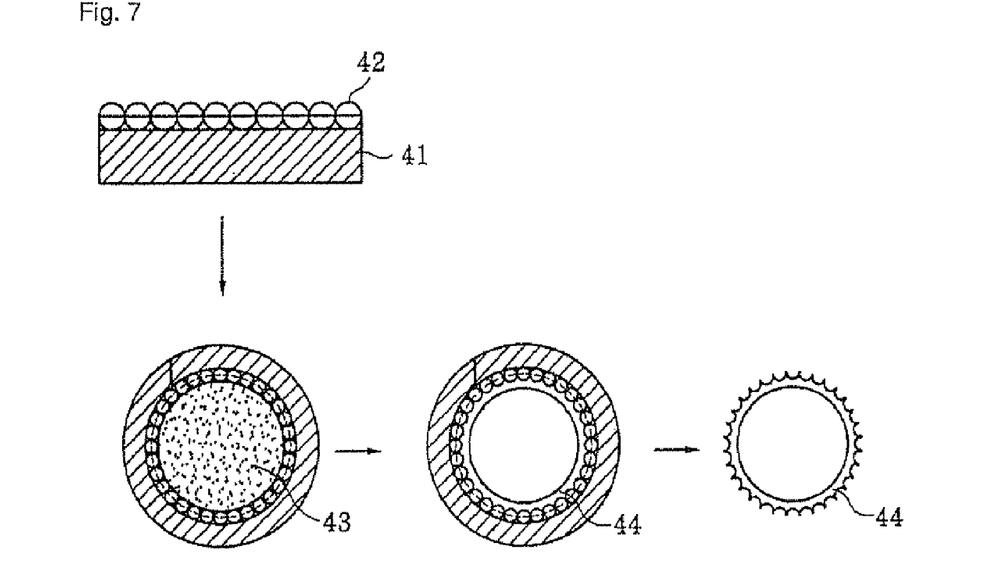
FIGS. 7 and 8: typical embodiments of the present invention for the process of fabricating a patterned sheet used in the production of the light diffusive sheet according to the present invention.

The patterned metal or polymer sheet may be in the form of a plate as well as a cylindrical tube. The patterned metallic or polymeric cylindrical tube may be obtained by converting the bead-containing thermoplastic resin layer into a cylindrical tube using a cylindrical frame, prior to conducting the plating or laminating procedure, respectively, on the bead-containing resin layer. For example, FIG. 7 illustrates the fabrication of such a patterned cylindrical metal tube. Specifically, substrate (41) having bead-containing resin layer (42) is wound around cylindrical tube (43) such that bead-containing resin layer (42) faces cylindrical tube (43), and both ends of substrate (41) are fused together. Then, cylindrical frame (43) is removed, and metal layer (44) is plated on bead containing resin layer (42). This method can provide a patterned roller having a continuous pattern.

Figure 8:
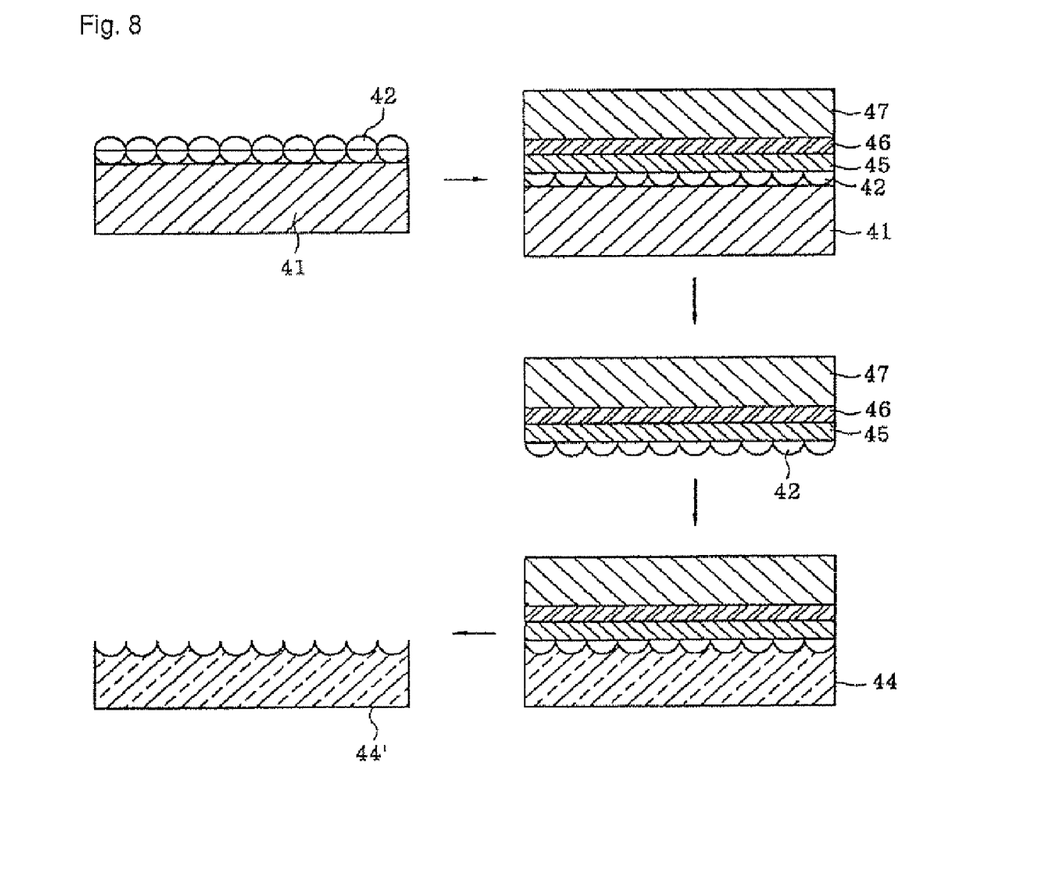

Further, in the metal or polymer sheet fabrication process, the respective metal-plating or coating process or the photo- or thermo-curable resin coating process may be conducted directly on the bead-containing layer (42) formed on the thermoplastic resin, or alternatively, after beads are moved into an other substrate via an adhesive layer to obtain a more strong fixability of beads to a substrate, as shown in FIG. 8.

For example, referring to FIG. 8 on the bead (42)-containing resin layer (41), binder resin layer (45) for fixing the beads, and adhesive layer (46) are successively formed, and support (47) is laminated thereon. After heat-pressurization, a laminate of beads (42)/binder (45)/adhesive (46)/support (47) is separated from the transparent substrate (41). Thereafter, metal layer (44) is formed on beads (42) and released therefrom to obtain the patterned metal sheet (44').

The binder resin (45) for fixing beads may be a conventional adhesive resin such as an acryl-, urethane-, melamine-, ester-, or benzene-based resin, which is photocurable or thermocurable. The binder resin may be coated to a thickness ranging from 5 to 100 μm.

Examples of adhesive (46) which may be used in the present invention include ethylene vinylacetate (EVA); a polyethylene-based, polyurethane-based, or ethylene-vinylacetate based hot melt adhesive; and a photocurable resin such as a polyester resin, epoxy resin, or (meth)acrylate resin (e.g., polyester(meth)acrylate, epoxy(meth)acrylate, urethane(meth)acrylate). The adhesive may be formed to a thickness ranging from 0.01 to 1 μm.

The substrate (47) may be conventionally made of a transparent plastic resin such as a polyester, polyacryl, polycarbonate, polyvinylchloride, polyvinylidene fluoride, polyethylene, polypropylene, or polymethacrylamide resin; or a rubber or metal. The substrate (47) may have a thickness ranging from 0.05 to 5 mm.

The patterned metal or polymer sheet obtained by the method shown in FIG. 4B has the advantage of good dimension stability at a high temperature, and thus, it is suitable for making a light diffusive sheet having an enhanced luminance and light diffusability.

The plating of a metal layer in the fabrication of the patterned metal sheet may be conducted by electroplating, preferably after forming a metal thin film on the bead-containing resin layer via a silver mirror reaction or evaporation.

The metal sheet used in the present invention may be made of nickel, zinc or tin, and may further comprise a Cr coating layer thereon. The metal sheet preferably has a thickness ranging from 0.05 to 2 mm.

In the inventive process, the coating of a photocurable resin composition for the formation of the protrusions may be carried out using a conventional method, including a Meyer bar coating, air knife coating, die coating, gravure roll coating, reverse roll coating, spray coating, and blade roll coating method, and the thickness (based on dried state) of the coating formed on the surface of the recessed portions of the patterned roller or belt, or the transparent substrate may be in the range of 5 to 60 μm.

In the inventive process, the pressurizing-curing step is preferably conducted while maintaining the patterned polymer or metal sheet at a temperature of 30 to 120° C. If the temperature is lower than 30° C., the appearance and the luminance of the sheet deteriorate, whereas if the temperature is higher than 120° C., the substrate becomes deformed.

Temperature elevation of the sheet may be achieved by heat generated by light irradiated for curing the photocurable resin composition, or alternatively, by additionally using a separate heating means. Further, the temperature control of the sheet may be achieved using a suitable cooling means involving a cooling water circulation, air circulation, or other cooling medium circulation mode.

When the temperature of the sheet is within the above range, the photocurable resin composition preferably has a viscosity of 30 to 1,000 centipoise (cps). When the viscosity is less than 30 cps, the resin composition is not uniformly coated, whereas when the viscosity is greater 1,000 cps, bubbles are not removed, thus deteriorating the appearance and the luminance of the light diffusive sheet.

As mentioned previously, the inventive diffusive sheet may optionally comprise a scratch resistance layer, and in this case, a transparent substrate having an optional scratch resistance layer may be used in the process shown in FIGS. 5 and 6.

In the case that the inventive sheet further comprises a photocured resin layer in the form of plurality of recessed portions having hemispherical shapes on the face opposite to the protrusion-formed face of the substrate, as a scratch resistance layer, the photocured recessed layer may be formed by coating a photocurable resin composition on one surface selected from the transparent substrate and a patterned roller or belt having a plurality of hemispherical shaped protrusions on the surface thereof, contacting the resulting coating with the other surface, pressurizing-curing the resulting laminate, and separating the laminate with each other.

The roller or belt having the plurality of hemispherical-shaped protrusions on the surface thereof may be made of a metal such as aluminum, brass and steel, or a synthetic resin such as silicone resin, epoxy resin, ABS (acrylonitrile-butadiene-styrene) resin, fluorine resin, polymethylpentene resin. It may be fabricated by a Ni-electroforming or electroplating method, and it may preferably further comprise a Cr coating layer thereon.

The coating of the photocurable resin composition for the formation of the recessed portion may be carried out using a conventional method, including a Meyer bar coating, air knife coating, gravure coating, reverse roll coating, spray coating, and blade roll coating method, and the coating composition may be coated to a thickness ranging from 1 to 1,000 μm on the surface of the protrusion portions of the patterned roller or belt, or one surface of the transparent substrate.

Further, in case that the inventive light diffusive sheet further comprises a bead-containing transparent resin layer on the face opposite to the protrusion-formed face of the substrate as a scratch resistance imparting layer, the bead-containing transparent resin layer may be obtained simply by coating the bead-containing transparent resin composition using a conventional method, including a Meyer bar coating, air knife coating, gravure coating, reverse roll coating, spray coating, and blade roll coating method. The coating thickness may range from 1 to 50 μm. When the thickness is less than 1 μm, the beads are not well fixed, and when the thickness is greater than 50 μm, the optical properties of the sheet becomes poor.

The bead-containing resin composition may further contain a hardening agent, and suitable examples of the hardening agent include an isocyanate compound, which may be employed in an amount ranging from 1 to 40 parts by weight based on the 100 parts by weight of the resin used.

The bead-containing resin composition may further comprise conventional additives such as anti-static agent, wetting agent, pH controlling agent, anti-oxidant, dye, pigment, slipping agent, and others, in amounts not deteriorating the effect of the present invention, and it may optionally comprise a solvent such as water and an organic solvent (e.g., alcohols, phenols, ethers, aldehydes, ketones, carboxylic acids, amino-substituted amines).

Further, the primer layer inserted between the transparent substrate and the photocured resin layer to improve the coating and adhesion characteristics may be formed by coating a thermocurable resin composition with an organic solvent, or preferably in the form of an aqueous dispersion.

A coating composition for forming the primer layer may further comprise a conventional lubricant such as silica, alumina and talc so as to improve the releasing and winding properties, and if necessary, it further comprises additives such as anti-static agent, wetting agent, pH controlling agent, anti-oxidant, dye, pigment, slipping agent, and others, in amounts which do not deteriorate the effect of the present invention.

The light diffusive sheet according to the present invention has a haze of 70 to 95% and a light transmittance of 50 to 75%. If the haze is less than 70% or the transmittance is greater than 75%, the desired diffusion effect is not obtained. On the other hand, if the haze exceeds 95% or the transmittance is less than 50%, the luminance is lowered.

The light diffusive sheet for a backlight unit according to the present invention has excellent luminance, a wide screen view angle, and good anti-scratch properties.

The present invention is further described and illustrated in Examples provided below, which are, however, not intended to limit the scope of the present invention.

Example 1-1

A polyethylene terephthalate (PET) film of 125 μm thickness (SH-71 of SKC CO., Ltd., Korea) was coated with a polyethylene resin layer of 60 μm in thick and dispersed therein were glass beads having diameters of 30 to 60 μm while heating to 120° C. The resultant was pressurized using a roller to obtain a PET film having a bead-containing resin layer.

An Ni layer was electroplated to a thickness of 0.5 to 1.5 mm on the bead-containing resin layer, released therefrom, and then attached to the surface of a roller, to obtain a patterned roller for use in the fabrication of a light diffusive sheet in accordance with the present invention.

The Ni film having recessed portions of the patterned roller was coated with a photocurable resin having a refractive index of 1.49 (WOW149 of Wow Chemical, Korea) to a thickness of 20 μm, and a transparent PET film coated with a 0.03 μm-thick thermocurable polyurethane resin (primer layer) was laminated thereon such that the polyurethane resin primer layer came in contact with the photocurable resin layer. The resulting laminate was pressurized while maintaining the temperature of the Ni film at 60° C. and irradiated with a UV lamp to cure the resin layers. The photocured layer was separated from the patterned roller, to obtain a light diffusive sheet having a plurality of protrusions of photocured resin formed on a transparent PET film.

Example 1-2

The procedure of Example 1-1 was repeated except that a resin having a refractive index of 1.52 (A-BPE-10 of NK Ester, Japan) was employed as a photocurable resin.

Example 1-3

The procedure of Example 1-1 was repeated except that a resin having a refractive index of 1.55 (U-06 of Kyoeisha, Japan) was employed as a photocurable resin.

Example 1-4

The procedure of Example 1-1 was repeated except that a resin having a refractive index of 1.57 (WOW157 of Wow Chemical, Korea) was employed as a photocurable resin.

Example 1-5

The procedure of Example 1-1 was repeated except that a resin having a refractive index of 1.47 (U-60 of Sinnakamura, Japan) was employed as a photocurable resin.

Example 1-6

The procedure of Example 1-1 was repeated except that beads, at least 90% of which had diameters of 40 to 90 μm, were employed.

Comparative Example 1

A light diffusive sheet was prepared in accordance with a prior art method, as follows.

25.4 parts by weight of a binder resin (Acrydic AA-960-50 of Aekyung Chemical Co., Ltd., Korea) and 2.9 parts by weight of a hardening agent (Brunoc DN-950 of Aekyung Chemical Co., Ltd., Korea) were dissolved in 41.4 parts by weight of n-butyl acetate. To the resulting solution, 30.3 parts by weight of a light diffusing agent (Techpolymer MBX-15 of Selisui Chemical Co., Ltd., Japan) was added while stirring to obtain a dispersion. The dispersion was deposited on PET film (SH-71 of SKC Co., Ltd., Korea) coated with a 0.03 μm-thick thermocurable polyurethane layer to a thickness of 10 μm, and thermocured at 100 to 120° C., to obtain a light diffusive sheet.

Experimental Test 1

The light diffusive sheets prepared in Examples 1-1 to 1-6 and Comparative Example 1 were analyzed to determine their haze, light transmittance and luminance characteristics, and the results are shown in Table 1. The luminance was determined for both 1 sheet and 2 sheets with a luminance measuring apparatus (BM-7 of Topcon, Japan), and the haze and the light transmittance, with a hazemeter (NDH 5000 of Denshikogyo, Japan).

Table 1

TABLE 1

|  | Haze(%) | Light Transmittance (%) | Luminance (Cd/m$^2$) (1 sheet) | Luminance (Cd/m$^2$) (2 sheet) |
| --- | --- | --- | --- | --- |
| Ex. 1-1 | 85.86 | 57.86 | 7689 | 8492 |
| Ex. 1-2 | 86.78 | 57.83 | 7786 | 8070 |
| Ex. 1-3 | 87.23 | 56.80 | 7750 | 8175 |
| Ex. 1-4 | 86.96 | 55.13 | 7744 | 8249 |
| Ex. 1-5 | 85.60 | 59.03 | 7597 | 8531 |
| Ex. 1-6 | 83.48 | 58.42 | 7514 | 8720 |
| Com. Ex. 1 | 89.08 | 70.52 | 7253 | 7941 |

It can be seen from Table 1 that the inventive light diffusive sheets have good overall properties in terms of haze, light transmittance and luminance.

Example 2-1

A patterned roller for use in the fabrication of a light diffusive sheet was obtained by the same procedure as in Example 1-1.

Meanwhile, both surfaces of a polyethylene terephthalate (PET) film of 125 μm thickness (SH-71 of SKC CO., Ltd., Korea) were coated with a thermocurable polyurethane resin to a thickness of 0.03 μm each, and on one surface of the thermocurable resin layer, a photocurable resin having a refractive index of 1.49 (WOW149 of Wow Chemical, Korea) was coated to a thickness of 20 μm. The photocurable resin layer was allowed to contact with a roller having semispherical protrusions, each having a depth of 10 μm and a diameter of 150 μm, distributed at an interval of 500 μm on the surface thereof. The resulting laminate was pressurized and photocured with a UV lamp, and then separated to obtain a PET film having a plurality of recessed portions on one surface and a thermocurable polyurethane resin layer on the other surface thereof.

The Ni film having recessed portions of the above mentioned patterned roller was coated with a photocurable resin having a refractive index of 1.49 (WOW149 of Wow Chemical, Korea) to a thickness of 20 μm, and laminated with the polyurethane resin layer surface of the PET film which has a plurality of recessed portions on the other face thereof. The resulting laminate was pressurized while irradiating with a UV lamp to cure the resin layers, and the photocured layer was separated from the patterned roller, to obtain a light diffusive sheet having on its surfaces a plurality of protrusions made of photocured resin and a plurality of recessed portions made of photocured resin, respectively.

Example 2-2

The procedure of Example 2-1 was repeated except that a resin having a refractive index of 1.47 (U-60 of Shinnakamura, Japan) was employed as a photocurable resin for the formation of the recessed portions of the PET film.

Experimental Test 2

The light diffusive sheets prepared in Examples 2-1 and 2-2 and Comparative Example 1 were analyzed for the scratch resistance, haze, light transmittance and luminance, and the results are shown in Table 2. The luminance, the haze and the light transmittance were determined as in Experimental Test 1, and the scratch resistance was evaluated by contacting a soft waveguide plate with the light diffusive sheet to be tested under a load of 10 gf using a lip type push tester having a diameter of 2 mm, hitting the laminate 10,000 times, and then observing with an optical microscope the degree of scratch generated in the waveguide plate to express as the relative percentage when the result of Comparative example 1 is considered as 100%.

Table 2

TABLE 2

|  | Haze(%) | Light Transmittance (%) | Luminance (Cd/m$^2$) (1 sheet) | Luminance (Cd/m$^2$) (2 sheet) | Scratch Resistance (%) |
|---|---|---|---|---|---|
| Ex. 2-1 | 85.44 | 55.44 | 7766 | 8577 | 10 |
| Ex. 2-2 | 85.24 | 57.21 | 7673 | 8616 | 20 |
| Com. Ex. 1 | 89.08 | 70.52 | 7253 | 7941 | 100 |

It can be seen from Table 2 that the inventive light diffusive sheets have good overall properties in terms of haze, light transmittance, luminance, and scratch resistance.

Example 3-1

A patterned roller for use in the fabrication of a light diffusive sheet was obtained by the same procedure as in Example 1-1.

100 parts by weight of an acrylic binder resin (Acrydic AA-960-50 of Aekyung Chemical Co., Ltd., Korea), and 20 parts by weight of a hardening agent (Brunoc DN-950 of Aekyung Chemical Co., Ltd., Korea) were dissolved in a methyl ethyl ketone/toluene/oxytol mixture, and distributed therein was 10 parts by weight of polymethyl methacrylate beads having an average diameter of 5 μm, to obtain a bead dispersion.

Meanwhile, both surfaces of a polyethylene terephthalate (PET) film of 125 μm thickness (SH-71 of SKC CO., Ltd., Korea) were coated with a thermocurable polyurethane resin to a thickness of 0.03 μm each. The above bead dispersion was then deposited on one surface of the thermocurable resin layer and thermocured at 100 to 150° C., to obtain a transparent PET substrate having a bead-containing resin layer of a thickness of 1-5 μm on one surface thereof as a scratch resistance layer, the thermocurable polyurethane resin layer on the other surface thereof being kept intact.

The Ni layer having recessed portions of the above mentioned patterned roller was coated with a photocurable resin having a refractive index of 1.49 (WOW149 of Wow Chemical, Korea) to a thickness of 20 μm, and laminated with the polyurethane resin layer of the PET substrate having the scratch resistance layer on the other face thereof. The resulting laminate was pressurized while irradiating with a UV lamp to cure the resin layers, and the photocured layer was separated from the patterned roller, to obtain a light diffusive sheet having a scratch resistance layer according to the present invention.

Example 3-2

The procedure of Example 3-1 was repeated except that the bead-containing resin layer as a scratch resistance layer was formed using polymethyl methacrylate beads having an average diameter of 10 μm to a thickness of 8 to 13 μm.

Example 3-3

The procedure of Example 3-1 was repeated except that the bead-containing resin layer was formed using methylsilicone beads having an average diameter of 2 μm to a thickness of 1 to 5 μm.

Experimental Test 3

The light diffusive sheets prepared in Examples 3-1 to 3-3 and Comparative Example 1 were tested for the scratch resistance, haze, light transmittance and luminance, and the test results are shown in Table 3. The luminance, the haze and the light transmittance were determined as in Experimental Test 1, and the scratch resistance was evaluated as in Experimental Test 2.

Table 3

TABLE 3

|  | Haze(%) | Light Transmittance (%) | Luminance (Cd/m$^2$) (1 sheet) | Luminance (Cd/m$^2$) (2 sheet) | Scratch Resistance (%) |
|---|---|---|---|---|---|
| Ex. 3-1 | 85.67 | 57.80 | 7681 | 8482 | 10 |
| Ex. 3-2 | 85.59 | 57.74 | 7674 | 8473 | 10 |
| Ex. 3-3 | 85.75 | 57.85 | 7688 | 8489 | 20 |
| Com. Ex. 1 | 89.08 | 70.52 | 7253 | 7941 | 100 |

It can be seen from Table 3 that the inventive light diffusive sheets have good overall properties in terms of haze, light transmittance, luminance, and scratch resistance.

Examples 4-1 to 4-4

The procedure of Example 1-1 was repeated except that upon pressurizing the laminate, the temperature of the Ni layer was maintained at 40° C., 60° C., 100° C., and 120° C., respectively.

Comparative Examples 2 and 3

The procedure of Example 1-1 was repeated except that the temperature of the Ni film was set at 20° C. and 150° C., respectively.

Experimental Test 4

The light diffusive sheets prepared in Examples 4-1 to 4-4 and Comparative Examples 2 and 3 were tested for the in terms of haze, light transmittance and luminance, and the appearance and the deformation thereof were further evaluated. The test results are shown in Table 4. The luminance, the haze and the light transmittance were measured as in Experimental Test 1, and the appearance and the deformation were evaluated by visual inspection.

Table 4

TABLE 4

|  | Haze(%) | Light Transmittance (%) | Luminance (Cd/m$^2$) (1 sheet) | Luminance (Cd/m$^2$) (1 sheet) | Appearance | Deformation | Viscosity of UV-curable resin (cps) |
|---|---|---|---|---|---|---|---|
| Ex. 4-1 | 85.86 | 57.86 | 7689 | 8351 | Good | No | 200 |
| Ex. 4-2 | 86.78 | 57.83 | 7786 | 8320 | Good | No | 100 |

TABLE 4-continued

|   | Haze(%) | Light Transmittance (%) | Luminance (Cd/m²) (1 sheet) | Luminance (Cd/m²) (1 sheet) | Appearance | Deformation | Viscosity of UV-curable resin (cps) |
|---|---|---|---|---|---|---|---|
| Ex. 4-3 | 87.23 | 56.80 | 7750 | 8307 | Good | No | 70 |
| Ex. 4-4 | 86.96 | 55.13 | 7744 | 8295 | Good | No | 30 |
| Com. Ex. 2 | 86.90 | 55.49 | 7458 | 8197 | Bubble Generation | No | 2000 |
| Com. Ex. 3 | | Impossible to measure | | | Ununiform Thickness | Occurred | 20 |

It can be seen from Table 4 that the inventive light diffusive sheets have good overall properties in terms of haze, light transmittance, luminance, the appearance, and the deformation.

Example 5-1

A polyethylene terephthalate (PET) film of 125 μm thickness (SH-71 of SKC CO., Ltd., Korea) was coated with a polyethylene resin layer of 60 μm in thick and glass beads having diameters of 30 to 60 μm were dispersed therein while heating to 120° C. The resultant was pressurized using a roller to obtain a PET film having a bead-containing resin layer.

Thereafter, a photocurable resin having a refractive index of 1.49 (WOW149 of Wow Chemical, Korea) was coated on the bead-containing resin layer to a thickness of 20 μm, and a transparent PET film having a thickness of 188 μm was laminated thereon. The resulting laminate was pressurized while irradiating with a UV lamp to cure the resin layers, and separated from each other, to obtain a polyethylene sheet having a plurality of hemi-spherical recessed portion, which was then fixed on the surface of a roller, to obtain a patterned roller for use in the fabrication of a light diffusive sheet in accordance with the present invention.

The polyethylene sheet having recessed patterns was coated with a photocurable resin having a refractive index of 1.47 (WOW147 of Wow Chemical, Korea) to a thickness of 20 μm, and a transparent PET film coated with a 0.03 μm-thick thermocurable polyurethane resin (primer layer) was laminated thereon such that the polyurethane resin primer layer came in contact with the photocurable resin layer. The resulting laminate was pressurized while irradiating with a UV lamp to cure the resin layers. The photocured layer was removed from the patterned roller, to obtain a light diffusive sheet having a plurality of protrusions of the photocured resin formed on a transparent PET film.

Example 5-2

The procedure of Example 5-1 was repeated except that beads, at least 90% of which had different diameters within the range of 40 and 90 μm, were employed.

Example 5-3

The procedure of Example 5-1 was repeated except that a resin having a refractive index of 1.49 (WOW149 of Wow Chemical, Korea) was employed as a photocurable resin to be coated on the polyethylene sheet.

Example 5-4

The procedure of Example 5-1 was repeated except that a resin having a refractive index of 1.55 (U-06 of Kyoeisha, Japan) was employed as a photocurable resin to be coated on the polyethylene sheet.

Experimental Test 5

The light diffusive sheets prepared in Examples 5-1 to 5-4 and Comparative Example 1 were tested for the haze, light transmittance and luminance, and the test results are shown in Table 5. The luminance was determined for 1 sheet, 2 sheets and 3 sheets with a luminance measuring apparatus (BM-7 of Topcon, Japan), and the haze and the light transmittance, with a hazemeter (NDH 5000 of Denshikogyo, Japan).

Table 5

TABLE 51

|  | Haze (%) | Light Transmittance (%) | Luminance (Cd/m²) (1 sheet) | Luminance (Cd/m²) (2 sheets) | Luminance (Cd/m²) (3 sheets) |
|---|---|---|---|---|---|
| Ex. 5-1 | 73.69 | 58.71 | 7543 | 8085 | 7800 |
| Ex. 5-2 | 74.00 | 62.74 | 7359 | 8074 | 7949 |
| Ex. 5-3 | 73.73 | 60.24 | 7482 | 8032 | 7783 |
| Ex. 5-4 | 75.32 | 59.33 | 7423 | 7953 | 7623 |
| Com. Ex. 1 | 89.39 | 70.06 | 6972 | 7515 | 7386 |

It can be seen from Table 5 that the inventive light diffusive sheets have good overall properties in terms of haze, light transmittance and luminance.

While the subject invention has been described and illustrated with respect to the preferred embodiments only, various changes and modifications may be made therein without departing from the inventive concept of the present invention which should be limited only by the scope of the appended claims.

The invention claimed is:

1. A light diffusive sheet for a backlight unit, comprising a transparent substrate, a photocured resin layer and a primer layer disposed between the transparent substrate and the photocured resin layer, the surface of the photocured resin layer having a plurality of hemispherical protrusions of varying sizes and a photocured resin layer in the form of a plurality of hemispherical-shaped recessed portions, or a bead-containing transparent resin layer, formed on the surface opposite to the protrusion-formed face of the substrate.

2. The light diffusive sheet of claim 1, wherein the protrusions have various diameters in the range of about 10 to 100 μm.

3. The light diffusive sheet of claim 1, wherein the area of the protrusions constitutes 50 to 90% of the entire surface area of the photocured resin layer.

4. The light diffusive sheet of claim 1, wherein the space between protrusions forms a convex arc.

5. The light diffusive sheet of claim 1, wherein the photocured resin has a refractive index of 1.24 to 1.60.

6. The light diffusive sheet of claim 1, wherein the photocured resin is made of a polyester resin, epoxy resin, or (meth)acrylate resin.

7. The light diffusive sheet of claim 1, wherein the primer layer comprises a polyurethane-based resin.

8. The light diffusive sheet of claim 1, wherein the recessed portions of the photocured resin have various diameters in the range of 5 to 1,000 μm and a depth ranging from 1 to 500 μm.

9. The light diffusive sheet of claim 1, wherein the area of the recessed portions constitutes 5 to 50% of the entire surface area of the photocured resin layer.

10. The light diffusive sheet of claim 1, wherein both surfaces of a polyethylene terephthalate (PET) film of 125 μm thickness are coated with a thermocurable polyurethane resin to a thickness of 0.03 μm each, and on one surface of the thermocurable resin layer, a photocurable resin having a refractive index of 1.49 was coated to a thickness of 20 μm and the photocurable resin layer contacts a roller having semispherical protrusions, each having a depth of 10 μm and a diameter of 150 μm distributed at an interval of 500 μm on the surface of the roller and an Ni film having recessed portions of the roller is coated with a photocurable resin with a refractive index of 1.49 to a thickness of 20 μm and laminated with the polyurethane resin layer of the PET film having a plurality of recessed portions on the other surface.

11. The light diffusive sheet of claim 1, wherein both surfaces of a polyethylene terephthalate (PET) film of 125 μm thickness are coated with a thermocurable polyurethane resin to a thickness of 0.03 μm each, and on one surface of the thermocurable resin layer, a photocurable resin having a refractive index of 1.47 was coated to a thickness of 20 μm and the photocurable resin layer contacts a roller having semispherical protrusions, each having a depth of 10 μm and a diameter of 150 μm distributed at an interval of 500 μm on the surface of the roller and an Ni film having recessed portions of the roller is coated with a photocurable resin with a refractive index of 1.47 to a thickness of 20 μm and laminated with the polyurethane resin layer of the PET film having a plurality of recessed portions on the other surface.

12. A process for preparing a light diffusive sheet according to claim 1, comprising the steps of:
(i) fabricating a patterned roller or belt equipped with a metal or polymer sheet having a plurality of hemispherical-shaped recessed portions of varying sizes on the surface thereof;
(ii) coating a photocurable resin composition on the surface of the recessed portions of the patterned roller or belt (A), or on the surface of a primer layer coated on a transparent substrate (B);
(iii) laminating the surface of (A) and (B) such that the photocurable resin coating is disposed therebetween;
(iv) pressurizing the resulting laminate while curing the resin composition;
(v) releasing a laminate of the transparent substrate, the primer layer and the photocured resin layer, the surface of the photocured resin layer having a plurality of protrusions formed in conformity with the recessed portions on the surface of the patterned roller or belt; and
(vi) forming a photocured resin layer in the form of a plurality of recessed portions having hemispherical shapes on the face opposite to the protrusion-formed face of the substrate as a scratch resistance layer or forming a bead-containing transparent resin layer on the face opposite to the protrusion-formed face of the substrate as a scratch resistance layer;
the step of forming the photocured resin layer in the form of a plurality of recessed portions having hemispherical shapes comprises coating a photocurable resin composition on one surface selected from the transparent substrate and the patterned roller or belt having a plurality of hemispherical shaped protrusions on the surface thereof and contacting the resulting coating with the other surface, pressurize-curing the resulting laminate and separating the laminate from the patterned roller or belt;
the step of forming the bead-containing transparent resin layer comprises coating the bead-containing transparent resin layer by Meyer bar coating, air knife coating, gravure coating, reverse roll coating, spray coating or blade roll coating.

13. The process for preparing the light diffusive sheet of claim 12, wherein the polymer sheet is fabricated by forming a thermoplastic resin layer on the surface of a transparent substrate; introducing a plurality of spherical beads of varying sizes in the thermoplastic resin layer while melting the resin layer to form a bead-containing resin layer, the beads being partially imbedded in the thermoplastic resin layer; and removing the beads from the bead-containing resin layer using a photo- or thermo-curable resin or an adhesive film.

14. The process for preparing the light diffusive sheet of claim 13, wherein the beads removal or metal-plating procedure is conducted after transferring beads into another substrate via an adhesive layer.

15. The process for preparing the light diffusive sheet of claim 12, wherein the metal sheet is fabricated by forming a thermoplastic resin layer on the surface of a transparent substrate; introducing a plurality of spherical beads of varying sizes in the thermoplastic resin layer while melting the resin layer to form a bead-containing resin layer, the beads being partially imbedded in the thermoplastic resin layer; plating or coating the bead-containing resin layer with a metal to form a metal layer, and releasing the metal layer from the bead-containing resin layer.

16. The process for preparing the light diffusive sheet of claim 15, wherein the metal-plating procedure is conducted after forming a thin metal film via a silver minor reaction or evaporation, followed by electroplating.

17. The process for preparing the light diffusive sheet of claim 12, wherein the metal or polymer sheet is in the form of a plate or a cylindrical tube.

18. The process for preparing the light diffusive sheet of claim 17, wherein the metal or polymer sheet in the form of the cylindrical tube is obtained by converting the bead-containing thermoplastic resin layer into a cylindrical tube using a cylindrical frame.

19. The process for preparing the light diffusive sheet of claim 12, wherein the metal sheet is made of nickel, zinc or tin, optionally having a Cr coating layer thereon.

20. The process for preparing the light diffusive sheet of claim 12, wherein the polymer or metal sheet has a thickness ranging from 0.05 to 2 mm.

21. The process for preparing the light diffusive sheet of claim 12, wherein the pressurizing procedure is conducted at a temperature of the metal or polymer sheet of 30 to 120 C.

* * * * *